No. 879,388. PATENTED FEB. 18, 1908.
W. KIEL.
ARTICLE OF RUBBER COMPOUND.
APPLICATION FILED JUNE 26, 1906.
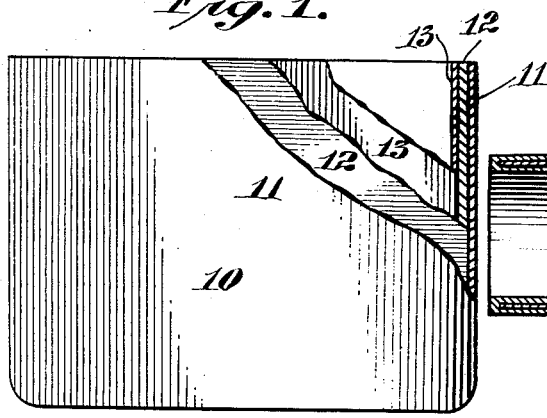
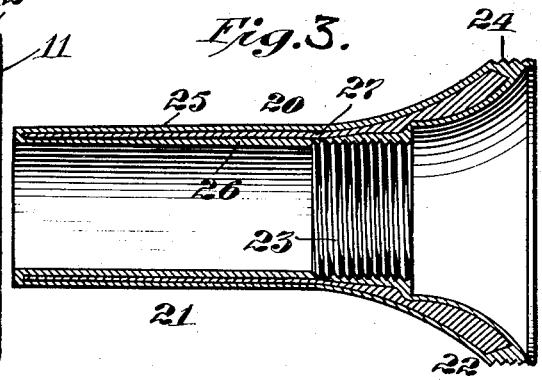
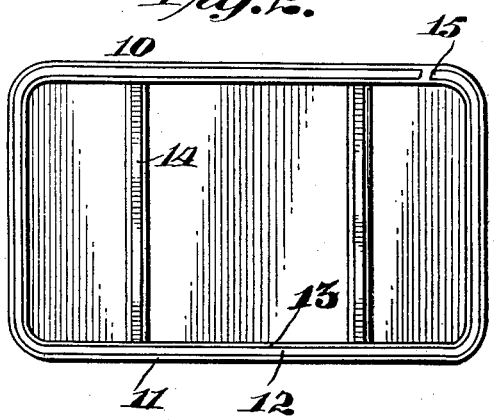
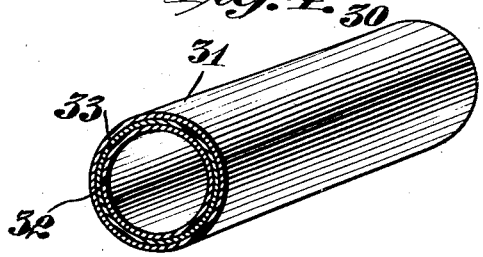

UNITED STATES PATENT OFFICE.

WILLIAM KIEL, OF BUTLER, NEW JERSEY, ASSIGNOR TO AMERICAN HARD RUBBER COMPANY, OF NEW YORK, N. Y., A CORPORATION OF NEW YORK.

ARTICLE OF RUBBER COMPOUND.

No. 879,388.　　　　Specification of Letters Patent.　　　　Patented Feb. 18, 1908.

Application filed June 26, 1906. Serial No. 323,438.

*To all whom it may concern:*

Be it known that I, WILLIAM KIEL, a citizen of the United States, and a resident of Butler, county of Morris, and State of New Jersey, have invented certain new and useful Improvements in Articles of Rubber Compound or the Like, of which the following is a specification.

My invention relates to sheets, vessels or other articles formed from rubber or rubber compound, or similar vulcanizable material. Its object is to increase the strength and flexibility and to decrease the frangibility of such articles, while securing all the advantages of a hard surface, such as susceptibility to polish and resistance to deterioration either by heat, age or ordinary chemical reactions.

Further objects of the invention will appear in the specification.

To attain these objects I form the sheet, vessel or other article of a plurality of layers, at least three in number, of vulcanizable compound, of which the exposed layers are hard, while the inner one is relatively flexible and usually softer. In a patent granted to me on May 8th, 1906, No. 819,765, I have shown and described a chemical vessel, the walls of which are composed of two layers of rubber or like vulcanizable compound, of which one, preferably the outer, was softer than the other. The object of this invention was to make a battery cell or other chemical vessel which should be resistant to the reactions of the chemicals contained therein, and which at the same time should be far less frangible than the ordinary cell or vessel. The softer compound of the outer layer of such vessels is usually made from a rubber compound which is less uniformly cured than the harder layer, and consequently subject to considerable deleterious change from the effect of age and heat, beside being more readily attacked by the chemicals which may be spilled thereon. The present invention unites the advantages of that cell with the other advantages specified above.

In the drawings, Figure 1 represents a chemical vessel, such as is used for the cells of storage batteries, embodying my invention, the cell being represented in elevation and partly broken away to show its construction. Fig. 2 is a top plan view of the cell. Fig. 3 is a longitudinal section of a telephone receiver embodying my invention. Fig. 4 is an elevation of a piece of tubing also embodying my invention.

Referring to Figs. 1 and 2 of the drawings, 10 designates the vessel, the walls of which are composed of three adherent layers 11, 12 and 13, the outer and inner layers 11 and 13 of which are of hard vulcanized rubber compound or the like, and the interposed layer 12 is of a special soft material, *e. g.*, a soft rubber compound. This interposed layer will receive a uniform superficial vulcanization on both sides by contact with the outer hard rubber layers during the vulcanizing process and will become firmly united thereto, whereby perfect support of such harder outer layers is afforded by the softer inner layer, whereas in my former invention the softer material came in contact with the hard rubber covering on one side only, thus receiving a less uniform vulcanization. 14 designates the vertical ribs usually placed in the bottom of the vessel to support the battery sheets.

In Fig. 3 of the drawings, 20 designates a telephone receiver handle having the usual approximately cylindrical body portion 21 and flared mouth 22. It is shown as provided with the usual interior thread portion 23 and exterior thread portion 24. As before, the outer layer 25 and the inner layer 26 of the handle are of hard compound, and the interposed layer 27 is of relatively soft compound. It will be seen that in the present instance the inner layer 27 is entirely embedded in or surrounded by the exposed layers 25 and 26, so that it is fully protected from exposure at all points. If a softer, less vulcanized outer surface is required, as for the purposes set forth in the acknowledged patent, it is best secured by placing a fourth, softer layer exteriorly of one of the hard layers, as in said patent, leaving said harder layer continuous and covering and protecting the intermediate softer layer of the present invention. The outer layer 25 of the structure here shown being of the usual hard material is susceptible of a high polish, while the danger of breaking the handle, which is so common in the ordinary hard rubber handles, is very much lessened and practically obviated by the introduction of the intermediate layer of less frangible material. The three layers being vulcanized together and thus firmly united, stresses on the outer, relatively frangible layers are distributed throughout the mass or body of the inclosed softer layer. As stated, the inner layer is itself superficially vulcanized to some extent, thereby obviating any very sharp line of demarcation between the layers and promoting such uniform distribution of stresses throughout the inner layer. The substantially complete inclosure of such inner layer contributes further to such distribution.

In Fig. 4 of the drawings, 30 represents a piece of tubing composed, as before, of an outer layer 31, an inner layer 32 and an interposed layer 33, the layers 31 and 32 being of relatively hard compound and the interposed layer 33 being relatively soft and flexible. In the case of the tube or like article, its flexibility is very much increased, while its susceptibility to polish, the smoothness of both its interior and exterior surfaces, and its resistance to attack by chemicals or the like is maintained.

It will be understood that the walls of the vessel shown in Figs. 1 and 2, and the tube shown in Fig. 4, are usually first made in sheet form and then joined together to form the article required, the joint being shown at 15 in Fig. 2. By the term "article" as used in the claims I therefore include the sheet from which any vessel, tube or the like is made.

In the drawings I have shown the various articles as composed of three layers only of vulcanizable compound, with the softer one interposed between the others. It is obvious, however, that some of the advantages of my invention may be secured, particularly in some articles, by using a greater number than three of the layers, of which it will not in every case be necessary that both the exposed layers be of the harder compound. As stated, if a softer, outer layer be required it is best affixed to one of the harder layers of the three-layer article herein described, as an additional layer.

What I claim is:—

1. An article comprising three cohering layers of which the outer layers are composed of relatively hard rubber compound and the intermediate layer is of relatively soft superficially vulcanized material united to the outer layers and substantially completely covered and protected thereby.

2. An article composed of three layers of rubber compound, the outer and exposed layers being of relatively hard vulcanized material and the intermediate layer of relatively soft superficially vulcanized material united to said outer layers and substantially completely covered and protected thereby.

3. A hollow article of rubber compound having inner and outer layers of relatively hard vulcanized material and another layer intermediate said inner and outer layers of relatively soft superficially vulcanized material, said intermediate layer being united to the other layers and substantially completely covered and protected against exposure thereby.

4. A receptacle for chemicals having on its inner and outer surfaces layers of relatively hard, resistant rubber material and intermediate said layers and substantially completely covered and protected against exposure thereby, another layer of relatively soft rubber compound superficially vulcanized and united to said other layers.

In testimony whereof I have signed this specification in the presence of two subscribing witnesses.

WILLIAM KIEL.

Witnesses:
PAUL WITTECH,
GEO. J. FRITZ.